US011321376B2

(12) United States Patent
Terrazas-Moreno et al.

(10) Patent No.: US 11,321,376 B2
(45) Date of Patent: May 3, 2022

(54) CLASSIFICATION OF OPERATING PLAN DATA USING MACHINE LEARNING

(71) Applicant: Aspen Technology, Inc., Bedford, MA (US)

(72) Inventors: Sabastian Terrazas-Moreno, Houston, TX (US); Stacy Janak, Houston, TX (US); Dimitrios Varvarezos, Houston, TX (US)

(73) Assignee: ASPEN TECHNOLOGY, INC., Bedford, MA (US)

( * ) Notice: Subject to any disclaimer, the term of this patent is extended or adjusted under 35 U.S.C. 154(b) by 427 days.

(21) Appl. No.: 16/372,970

(22) Filed: Apr. 2, 2019

(65) Prior Publication Data

US 2020/0320338 A1    Oct. 8, 2020

(51) Int. Cl.
*G06F 16/35*    (2019.01)

(52) U.S. Cl.
CPC .......... *G06F 16/353* (2019.01); *G06F 16/355* (2019.01)

(58) Field of Classification Search
CPC .............................. G06F 16/353; G06F 16/355
See application file for complete search history.

(56) References Cited

U.S. PATENT DOCUMENTS

| 7,949,624 | B2 | 5/2011 | Kelly et al. |
| 8,046,318 | B2 | 10/2011 | Stluka et al. |
| 2011/0145238 | A1* | 6/2011 | Stork .................... G06K 9/6219 707/737 |

(Continued)

FOREIGN PATENT DOCUMENTS

| EP | 3166057 A1 | 5/2017 |
| WO | 00/33218 A1 | 6/2000 |

(Continued)

OTHER PUBLICATIONS

Wold, S., Ruhe, A., Wold, H., & Dunn, W. (1984). The collinearity problem in linear regression. The partial least squares (PLS) approach to generalized inverses. Society for Industrial and Applied Mathematics , vol. 5; 735-743.

(Continued)

*Primary Examiner* — Amanda L Willis
(74) *Attorney, Agent, or Firm* — Hamilton, Brook, Smith & Reynolds, P.C.

(57) ABSTRACT

A computer system provides improved classification of operating and scheduling plan data of a process plant. The system finds patterns in cases of the plan data and, based on the patterns, organizes the cases into a hierarchical structure of clusters representing distinct conditions. The system receives a dataset of cases of operating plan data represented by process variables. The system reduces a number of process variables representing operating plan data in the dataset by generating principal component(s) from values of the process variables for each case. The principal component (s) are latent variables generated to capture variation in conditions across the cases. For each case, the system determines a value for each generated principal component in the dataset. Using automated clustering or machine learning techniques, the system iteratively clusters the cases into a hierarchical structure based on the respective determined value of each generated principal component. The hierarchical structure provides temporal and spatial classification indicating the distinct operating conditions across cases.

23 Claims, 10 Drawing Sheets

(56) References Cited

U.S. PATENT DOCUMENTS

| | | | |
|---|---|---|---|
| 2014/0344007 A1 | 11/2014 | Shende et al. | |
| 2018/0137219 A1 | 5/2018 | Goldfarb et al. | |
| 2018/0300637 A1 | 10/2018 | Yan et al. | |
| 2019/0166024 A1* | 5/2019 | Ho | G06N 20/00 |
| 2020/0320131 A1 | 10/2020 | Terrazas-Moreno et al. | |

FOREIGN PATENT DOCUMENTS

| | | |
|---|---|---|
| WO | 2020205149 A1 | 10/2020 |
| WO | 2020205150 A1 | 10/2020 |

OTHER PUBLICATIONS

Rui Xu and Donald C. Wunsch, "Survey of Clustering Algorithms", IEEE Transactions on Neural Networks 16 (May):645-678, 2005.

Jackson, J. (1991). A User's Guide to Principal Components. New York: John Wiley.

"Notification of Transmittal of The International Search Report and The Written Opinion of the International Searching Authority, or the Declaration," issued for International Application No. PCT/US2020/021106, entitled "Classification of Operating Plan Data Using Machine Learning," dated Apr. 24, 2020.

Wold H., Estimation of principal components and related models by iterative least squares In Multivariate Analysis, Krishnaiah P. (ed.), Academic Press: New York, 1966, pp. 391-420.

Xu, R. & Wunsch, D., Survey of Clustering Algorithms, IEEE Transactions on Neural Networks 16 (May), pp. 645-678, 2005.

Pedregosa, F. et al., Machine Learning in Python, Journal of Machine Learning Research 12 (Oct.), pp. 2825-2830, 2011.

Murtagh, F. et al., Ward's Hierarchical Agglomerative Clustering Method: Which Algorithms Implement Ward's Criterion?, Journal of Classification 31, pp. 274-295, 2014.

Wold, S. et al., PLS—Partial—Least Squares Projections to Latent Structures (1993).

Kubinyi, H., 3D-QSAR in Drug Design, Theory, Methods, and Applications (pp. 523-550), Ledien: ESCOM Science (1993).

Notification of Transmittal of the International Search Report and the Written Opinion of the International Searching Authority, or the Declaration, "Validation Of Operating Plans And Schedules Using Machine Learning," PCT/US2020/021114, dated Jun. 15, 2020.

International Preliminary Report on Patentability received for PCT Patent Application No. PCT/US2020/021106, dated Oct. 14, 2021, 8 pages.

International Preliminary Report on Patentability received for PCT Patent Application No. PCT/US2020/021114, dated Oct. 14, 2021, 9 pages.

\* cited by examiner

CLASSIFICATION OF OPERATING PLAN DATA USING MACHINE LEARNING

BACKGROUND

Process plants, such as oil refineries, follow operating guidelines with the goal of maximizing efficiency and economic profit. Process plants update those guidelines frequently through monthly operating plans (MOPs) or even weekly operating plans (WOPs). Generating operating plans requires experienced staff, several rounds of revisions, and specialized technology, such as mathematical programming tools. The process of generating operating plans is time consuming and resource intensive. In addition to the time spent in generating the actual plan, experienced planners need to invest significant resources into training junior staff before the junior staff can reliably take over their functions with respect to the plan.

SUMMARY

Organizations that run process plants have access to several years of historical (past) MOPs and WOPs. Past operating plans contain the know-how and expertise of the organization and are good references for generating and validating current operating plans. Taking advantage of the past plans could shorten the time to generate current MOPs or WOPs, improve the quality of those MOPs/WOPs, and allow junior planners to work independently earlier. However, the variability in internal (operating) and external (market) conditions make any useful comparison of past versus current operating plans a challenge. There are specific challenges that these organizations face in trying to use past operating plans. For example, one specific challenge is determining how the past operating plans can be classified to reflect different modes of operation and different market conditions, which can then be used to create or validate a current plan. Another specific challenge is determining which class(es) or subset(s) of past operating plans are most useful for creating or validating a current operating plan.

The embodiments disclosed herein address challenges in using historical operating and scheduling plans of a process plant to generate or validate current operating and scheduling plans. One example embodiment is a computer-implemented method of classifying operating plan data of an industrial process. The example method includes receiving a dataset including one or more cases of operating plan data. The operating plan data of each case are represented by one or more process variables. The method further includes reducing a number of process variables representing operating plan data in the dataset by generating at least one principal component from values of the one or more process variables for each case. The principal component(s) is generated to capture variation across the one or more cases. For each case, the method includes determining a value for each generated principal component in the dataset. The method further includes iteratively clustering the one or more cases into a hierarchical classification structure based on the respective determined value of each generated principal component.

Another example embodiment is a computer system for classifying operating planning data of an industrial process. The example system includes a processor operatively coupled to a data storage system. The processor is configured to implement a preprocessing module, a principal component analysis module, and a hierarchical clustering module. The preprocessing module is configured to receive a dataset including one or more cases of operating plan data. The operating plan data of each case are represented by one or more process variables. The principal component analysis module is configured to reduce a number of process variables representing operating plan data in the dataset by generating at least one principal component from values of the one or more process variables for each case. The principal component(s) is generated to capture variation across the one or more cases. The principal component analysis module is further configured to, for each case, determine a value for each generated principal component in the dataset. The hierarchical clustering module is configured to iteratively cluster the one or more cases into a hierarchical classification structure based on the respective determined value of each generated principal component.

Another example embodiment is a non-transitory computer-readable data storage medium comprising instructions to cause a computer to receive a dataset including one or more cases of operating plan data. The operating plan data of each case are represented by one or more process variables. The instructions further cause the computer to reduce a number of process variables representing operating plan data in the dataset by generating at least one principal component from values of the one or more process variables for each case. The principal component(s) is generated to capture variation across the one or more cases. The instructions further cause the computer to, for each case, determine a value for each generated principal component in the dataset, and iteratively cluster the one or more cases into a hierarchical classification structure based on the respective determined value of each generated principal component.

Operating plan data can include scheduling data, and process variables can include primal variables and dual variables. A case of operating plan data can be defined based on at least one of: time period, operating conditions, marketing conditions, scheduling conditions, material composition, transactional elements, and discrete events including at least one of: shipments, transfers, receipts, maintenance, and campaigns. A case can be a child of another case.

The received dataset can be structured by mapping each case to values of the one or more process variables for the case, or by mapping each case to the respective determined values of the at least one principal component. Reducing the dataset can include constructing a principal component analysis (PCA) model that reduces dimensionality of the data of the dataset.

The at least one principal can be generated by projecting the values of the one or more process variables into a reduced space of latent variables, where the latent variables represent the process variable(s) based on relevancy in indicating variability across the one or more cases.

Iterative clustering can be performed using one or more agglomerative clustering techniques. Iteratively clustering the one or more cases can include (i) joining cases into pairs based on respective determined values of the generated principal components being within a certain first distance to each other, where the joined pairs represent first level clusters of the hierarchical structure, (ii) joining the first level clusters and cases into pairs based on respective determined values of the generated principal components being within a certain second distance to each other, where the joined first level clusters and cases represent second level clusters of the hierarchical structure, and (iii) continuing joining prior level clusters and cases into pairs based on respective determined values of generated principal components until all the one or more cases are included in a single cumulative cluster, where the single cumulative cluster represents the final level cluster of the hierarchical structure.

Embodiments of the methods and systems disclosed herein can also include (i) receiving metadata providing expected groupings of the one or more cases based on business priorities, where each grouping is assigned a label, (ii) comparing clusters in the hierarchical structure against the groupings in the received metadata, (iii) labeling a cluster resembling a grouping with the associated label of the grouping, and (iv) identifying a case as an outlier in the context of the clusters of the hierarchical structure.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
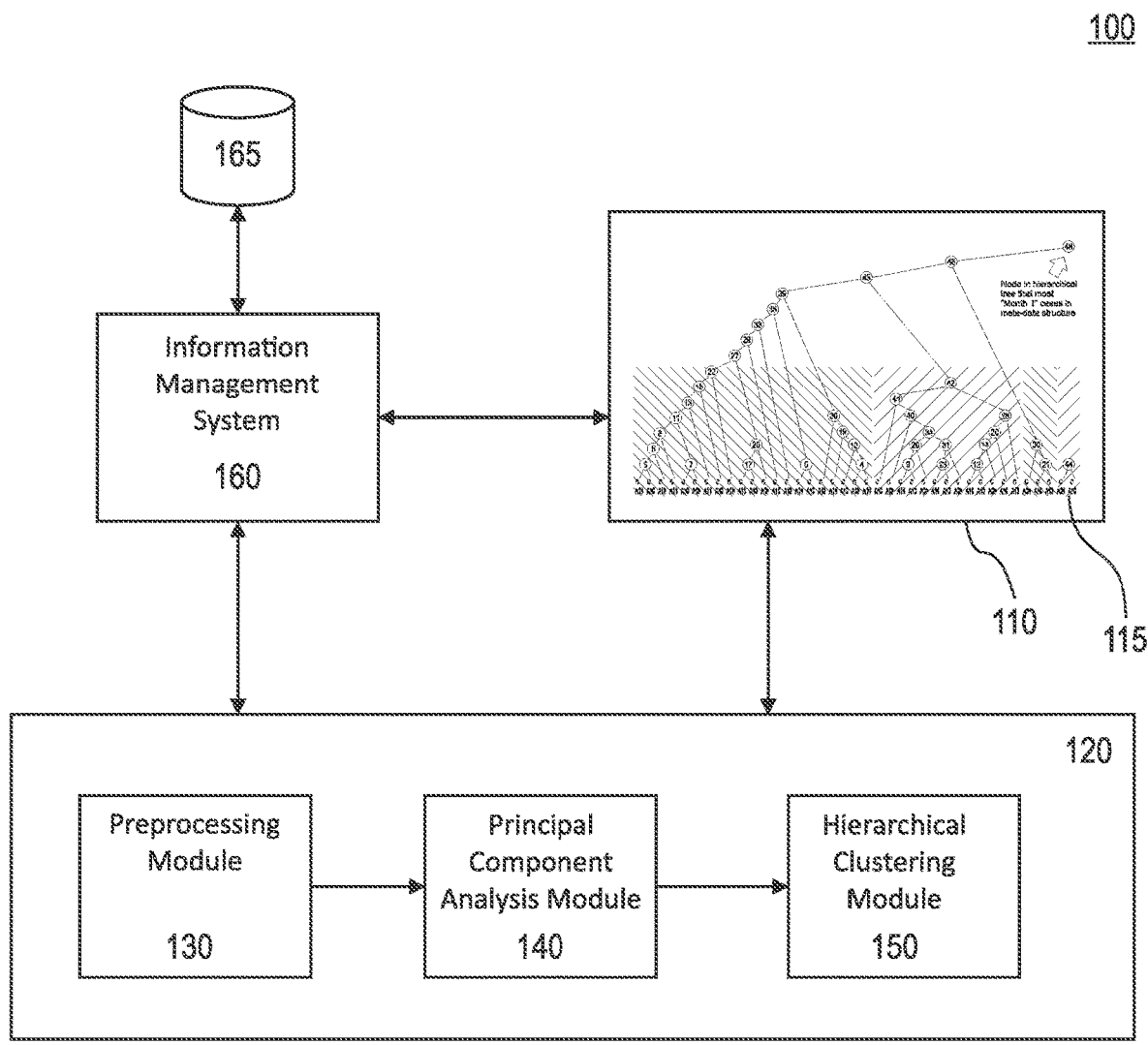
FIG. 1A is a block diagram of an example system for classifying and executing operating and scheduling plan data, according to an example embodiment.

A description of example embodiments follows.

The embodiments disclosed herein address challenges in using historical operating and scheduling plans of a process plant to generate or validate current operating and scheduling plans. To address these challenges, example embodiments locate patterns in historical operating plans of a plant or plant process. Based on the located patterns, example embodiments organize the historical operating plans into classes or clusters representing distinct operating and market conditions. The embodiments can use Principal Component Analysis (PCA) to generate a reduced representation of the operating plans' data. Using PCA, the embodiments can project all the process variables (primal and dual) contained in a MOP or WOP onto a few dimensions that are the most significant in describing the variability in conditions among operating plans. Such PCA is described in Wold H., "Estimation of principal components and related models by iterative least squares In Multivariate Analysis," Krishnaiah P. (ed.), Academic Press: New York, 1966, pages 391-420 (incorporated herein by reference in its entirety).

Using the reduced representation of the data, the embodiments can organize the operating plans into subsets by using machine learning (ML) clustering techniques. Examples of such ML clustering techniques are described in Rui Xu and Donald C. Wunsch, "Survey of Clustering Algorithms," IEEE Transactions on Neural Networks 16 (May), pages 645-678, 2005 (incorporated herein by reference in its entirety). The embodiments disclosed herein combine PCA and ML clustering techniques in a unique way to provide a temporal (across weeks, months and seasons) and spatial (based on process availability and process intensity) hierarchical classification of operating plans. Such classification facilitates the selection of the most relevant operating cases to generate or validate any current operating plan.

On the temporal dimension, the hierarchical classification by the embodiments provides clusters of similar WOPs and illustrates how these WOPs aggregate into MOPs, and how these MOPs aggregate into seasonal operating plans. On the spatial level, the hierarchical classification by the embodiments illustrates how operating plans at different time scales cluster by similarity in terms of process availability and process intensity. Using this hierarchical classification, a planner or planning organization can compare any current operating case to the most similar season (cluster made of monthly plans), the most similar month (cluster of weekly plans), or the most similar week of operating plans. The embodiments may perform a comparison at any time scale against those cases that are most similar in terms of process availability and intensity.

Example embodiments are directed to computer systems, apparatus, methods, and program products that classify operating and scheduling plan data of a process or industrial plant. The computer system includes a processor operatively coupled to a data storage system. The processor is configured to implement a preprocessing module, a principal component analysis module, and a hierarchical clustering module.

The computer systems, apparatus, methods, and program products receive a dataset including one or more cases of operating plan data and scheduling plan data. The operating plan data of each case are represented by one or more process variables, which may include primal variables and dual variables. A case of operating plan data may be defined based on at least one of: time period, operating conditions, marketing conditions, scheduling conditions, and material composition. At least one case of operating plan data may be a child of another case of operating plan data in the received dataset. The computer systems, apparatus, methods, and program products may structure the received dataset by mapping each case to values of the one or more process variables for the case.

Using the dataset, the computer systems, apparatus, methods, and program products reduce the received dataset by generating at least one principal component from values of the one or more process variables for each case. The computer systems, apparatus, methods, and program products generate the at least one principal component to capture variation across the one or more cases. In embodiments, the computer systems, apparatus, methods, and program products reduce the dataset by constructing a principal component analysis (PCA) model used to reduce dimensionality of the dataset. In some embodiments, the systems, apparatus, methods, and program products generate the at least one principal component by projecting the values of the one or more process variables into a reduced space of latent variables. These latent variables represent the one or more process variables based on relevancy in indicating variability across the one or more cases. For each case, the computer systems, apparatus, methods, and program products determine a value for each generated principal component in the reduced dataset. The computer systems, apparatus, methods, and program products may structure the reduced dataset by mapping each case to the respective determined values of the at least one principal component.

Using the reduced dataset, the computer systems, apparatus, methods, and program products iteratively cluster the one or more cases into a hierarchical classification structure based on the respective determined value of each generated principal component. The computer systems, apparatus, methods, and program products may cluster the one or more cases using one or more agglomerative clustering techniques. In example embodiments, the computer systems, apparatus, methods, and program products cluster the one or more cases as follows. The computer systems, apparatus, methods, and program products join cases into pairs based on respective determined values of the generated principal components being within a certain first distance to each other. The joined pairs represent first level clusters of the hierarchical structure. The computer systems, apparatus, methods, and program products then join first level clusters and cases not yet jointed into pairs based on respective determined values of the generated principal components being within a certain second distance to each other. The joined first level clusters and cases represent second level clusters of the hierarchical structure. The computer systems, apparatus, methods, and program products continue joining prior level clusters and cases into pairs based on respective determined values of generated principal components until all the one or more cases are included in a single cumulative cluster. The single cumulative cluster represents the final level cluster of the hierarchical structure. The hierarchical structure provides temporal (across weeks, months, and seasons) and spatial (based on process availability and process intensity) hierarchical classification of the one or more cases of operating and scheduling plan data.

In some embodiments, the computer systems, apparatus, methods, and program products further receive metadata providing user-defined groupings of the one or more cases, where each grouping includes an assigned a label. The computer systems, apparatus, methods, and program products compare clusters in the hierarchical structure against the groupings in the received metadata. The computer systems, apparatus, methods, and program products label a cluster resembling a grouping with the associated label of the grouping. The labeled clusters enable a user or system to validate a current operating plan against the clusters in the hierarchical structure most relevant to the conditions surrounding the current operating plan.

Overview of Example Embodiments

Methodologies or tools customarily used for classifying operational planning data can be divided in two broad categories. The first category of methodologies use heuristics and business rules to classify data. The second category of methodologies apply statistical algorithms to classify the data. Methodologies presented herein are distinct because these methodologies use the unique combination of unsupervised machine learning techniques, principal component analysis modeling, and metadata processing. Example unsupervised machine learning techniques are described in Fabian Pedregosa et al., "Machine Learning in Python," Journal of Machine Learning Research 12 (Oct), pages 2825-2830, 2011 (incorporated herein by reference in its entirety). The following explains an advantage of the disclosed embodiments over such customary methodologies used to classify planning and scheduling data.

A common practice in oil refineries and petrochemical plants is to provide a user-defined label associated with each planning case according to heuristics/business rules. These user-defined labels typically include the planning periods (e.g., month and year) of the planning case and an unstructured description of the main characteristics of the planning period (e.g., Catalytic Reformer Unit down, no naphtha imports). The planning cases are then stored in a data storage system and can be extracted by querying the case in the data storage system based on the associated user-defined labels. In comparison to this common practice, embodiments disclosed herein do not require labeling to find individual planning cases, but rather uses unsupervised machine learning techniques to find classes or clusters of multiple cases representing distinct operating or marketing condition. Additionally, embodiments not only allow for finding multiple cases (e.g., summer case+train 1 turnaround case) representing distinct conditions, but also creates a hierarchy of those cases that is specific to the dataset being classified. For example, the embodiments find and cluster the cases of the dataset based on distinct conditions associated with the cases, and then hierarchically present the cases in the form of a tree of clusters.

A common statistical method for finding groups in unlabeled datasets involves machine learning (ML) clustering algorithms. There are two example features that make the disclosed embodiments unique in the context of clustering technologies. First, the embodiments involve using a PCA model prior to applying the clustering algorithm, which reduces the dimensionality of the data to those components that are most relevant in finding and cluster cases representing distinct conditions. Second, the embodiments produce a hierarchical tree of clusters, using agglomerative clustering techniques, which contains a selection of baseline clusters that are the most intuitive and useful for the operation planners. Example agglomerative clustering techniques are described in Fionn Murtagh et al., "Ward's Hierarchical Agglomerative Clustering Method: Which Algorithms Implement Ward's Criterion?," Journal of Classification 31, pages 274-295, 2014 (herein incorporated by reference in its entirety). The selection of baseline clusters by the algorithm can be guided by the user-provided labels of the metadata or generated independently by methods disclosed herein. Resulting from the clustering algorithm, the user is provided with a set of base clusters that match as close as possible the user-expected grouping of the cases (summer, winter, etc.). The user is also provided with a hierarchical tree of cases that can easily be navigated to illustrate how the baseline clusters agglomerate into more general clusters or decompose into more granular clusters.

Example Systems for Classifying Operating and Scheduling Plan Data

FIG. 1A is a block diagram of an example system 100 for classifying operating and scheduling plan data of a process plant, according to an example embodiment. The example system 100 includes a display device 110 configured to display a user interface 115. The display device 100 may be a personal computer, smart phone, tablet, or any other such device known in the art. The display device 110 is communicatively coupled to an Information Management System 160, such as Aspen Production Information Management System (PIMS), associated with memory 165 (e.g., database). The display device 110 is also coupled to a classification engine or processor 120 configured to execute modules, including a preprocessor module 130, a principal component analysis module 140, and a hierarchical clustering module 150. In an example embodiment, one or more of the modules 130, 140, 150 can be implemented in the Python programming language.

Each module 130, 140, 150 executes data management and machine learning functionality that together generates a temporal and spatial hierarchical structure by classifying data from historical operating plans. The hierarchical structure may be temporal, spatial, and the like. In embodiments, the modules 130, 140, 150 may generate the hierarchical structure from a combination of historical scheduling plans and operating plans. The generated hierarchical structure is organized into classes or clusters representing distinct operating and market conditions of the historical operating plans.

The preprocessing module 130 receives from the information management system 160 historical operating plans having operating plan data. In the embodiment of FIG. 1A, the information management system 160 retrieves the historical operating plans from the associated memory 165 where the information management system 160 stores the plans. In other embodiments, the preprocessing module 130 may receive operating plans from any computer system, computer application, or memory (storage) device known in the art without limitation. The operating plans may be historical plans retrieved from memory or current plans retrieved from an executing plant process. The preprocessing module 130 may receive the operating plans from the information management system 160 in any format known in the art, such as Excel. In some embodiments, the preprocessing module 130 receives both operating plans and scheduling plans having operating and scheduling plan data. The received operating plans are arranged together in a dataset.

The dataset of operating plans comprises one or more cases of operating plan data. For example, the dataset may include cases from a particular month/day (e.g., Month 1, 1st day of Month 1), producing a particular product (e.g., gasoline), using particular amounts or types of materials (e.g., crude oils). The dataset may include a parent (base) case comprised of one or more children cases, such as a base case for Month 1 and a child case for crude oil produced in Month 1. The operating plan data of each case is represented by primal and dual process variables that are set to values to achieve the optimal operating solution for that case. In some instances, the operating plans for refinery planning models may be represented by more than 100,000 primal and dual variables. For example, Table 1 illustrates an example dataset consisting of 62 MOPs, where the operating data of each MOP is represented by more than 20,000 process variables.

TABLE 1

| Number of MOP | Variables per MOP |
|---|---|
| 62 | >20,000 |

The preprocessing module 130 structures the dataset in a format mapping each case to the process variables (with set values) representing the operating plan data of that case. In embodiments, the structured dataset is formatted as a M(cases) by N(primal and dual process variables) matrix.

The preprocessing module 130 also receives from the information management system 160 a metadata structure defining dependencies between cases of operating plan data. The user may define the metadata structure of case dependencies at the information management system 160 through the user interface 115 of display device 110. For example, the metadata structure may be automatically defined based on how the user created the cases in the information management system 160 (through user interface 115) to generate the received operating plans. The information management system 160 may store and retrieve the metadata structure from the associated memory 165. The metadata structure may be organized in the form of base (parent) cases having dependent child cases and can be modified to generate scenarios, parametric analysis, plan updates, and the like from the corresponding operating plan data.

Table 2 illustrates an example PIMS metadata structure that is configured to specify each case by the fields of: case identifier, case label, month of operating data for the case, and any parent case.

TABLE 2

| Case | Case Label | Month | Parent Case |
|---|---|---|---|
| CA1 | Month 1, 1$^{st}$ Case | Month 1 | — |
| CA2 | Month 1 Crude Change | Month 1 | CA1 |
| CA3 | Distillation Train (24 days)* | Month 1 | CA1 |
| CA4 | — | Month 1 | CA3 |
| CA5 | Spec change 1 | Month 1 | CA4 |
| CA6 | Spec change 2 | Month 1 | CA4 |
| CA7 | Unit 1 down | Month 1 | CA4 |
| CA8 | New process limit 1 | Month 1 | CA4 |
| CA9 | New process limit 2 | Month 1 | CA4 |
| CA10 | New process limit 3 | Month 1 | CA4 |
| CA11 | New process limit 4 | Month 1 | CA4 |
| CA12 | Unit 2 adjustment | Month 1 | CA4 |
| CA13 | New process limit 5 | Month 1 | CA12 |
| CA14 | New process limit 6 | Month 1 | CA13 |
| CA15 | New process limit 7 | Month 1 | CA13 |
| CA16 | Spec change 3 | Month 1 | CA13 |
| CA17 | Spec change 4 | Month 1 | CA13 |
| CA18 | Spec change 5 | Month 1 | CA13 |
| CA19 | Spec change 6 | Month 1 | CA13 |
| CA20 | P | Month 1 | CA16 |
| CA21 | New Process Limit 8 | Month 1 | CA13 |
| CA22 | New Process Limit 8 | Month 1 | CA13 |
| CA23 | New Process Limit 9 | Month 1 | CA13 |
| CA24 | New Process Limit 10 | Month 1 | CA13 |
| CA25 | New Process Limit 11 | Month 1 | CA24 |
| CA26 | Spec Change 7 | Month 1 | CA13 |
| CA27 | New Process Limit 12 | Month 1 | CA13 |
| CA28 | Unit 3 adjustment | Month 1 | CA13 |
| CA29 | New Process Limit 13 | Month 1 | CA28 |
| CA30 | New Process Limit 14 | Month 1 | CA13 |
| CA31 | New Process Limit 15 | Month 1 | CA28 |
| CA32 | New Process Limit 16 | Month 1 | CA31 |
| CA33 | New Process Limit 17 | Month 1 | CA32 |
| CA34 | New Process Limit 18 | Month 1 | CA31 |
| CA35 | New Process Limit 19 | Month 1 | CA34 |
| CA36 | Spec change 8 | Month 1 | CA34 |
| CA37 | Spec change 9 | Month 1 | |
| CA38 | New Process Limit 20 | Month 1 | CA34 |
| CA39 | New Process Limit 21 | Month 1 | CA34 |
| CA40 | New Process Limit 22 | Month 1 | CA34 |
| CA51 | New Process Limit 23 | Month 1 | CA34 |
| CA52 | New Process Limit 24 | Month 1 | CA34 |
| CA53 | New Process Limit 25 | Month 1 | CA42 |
| CA54 | New Process Limit 26 | Month 1 | CA34 |
| CA55 | New Process Limit 27 | Month 1 | CA34 |
| CA56 | New Process Limit 27 | Month 1 | CA34 |
| CA57 | New Process Limit 28 | Month 1 | CA34 |
| CA58 | Full Month 1 | Month 1 | CA2 |
| CB1 | Month 2 1$^{st}$ Case | Month 2 | — |
| CB2 | Month 2 weeks 1-2 | Month 2 | CB1 |
| CB3 | Month 2 weeks 3-4 | Month 2 | CB1 |
| CB4 | Month 2 Full Month | Month 2 | CB1 |
| CB5 | Month 2 Full Month - Market change 1 | Month 2 | CB4 |
| CB6 | Month 2 Full Month - Market change 2 | Month 2 | CB4 |
| CB7 | Month 2 Full Month - Market change 3 | Month 2 | CB5 |
| CB8 | Month 2 Full Month - Market change 4 | Month 2 | CB5 |
| CB9 | Month 2 Full Month - Market change 5 | Month 2 | CB5 |
| CB10 | Month 2 forecast | Month 2 | CB5 |
| CB11 | Month 2 Unit 1 adjustment | Month 2 | CB3 |
| CB12 | New Process Limit 29 | Month 2 | CB3 |
| CB13 | New Process Limit 30 | Month 2 | CB11 |
| CB14 | New Process Limit 31 | Month 2 | CB12 |
| CB15 | New Process Limit 32 | Month 2 | CB14 |

TABLE 2-continued

| Case | Case Label | Month | Parent Case |
| --- | --- | --- | --- |
| CB16 | New Process Limit 33 | Month 2 | CB14 |
| CC1 | Month 3 | Month 3 | — |
| CC2 | Month 3 Forecast | Month 3 | CC1 |

Table 2 illustrates the parent-child dependencies between the cases. For example, Table 2 illustrates the parent-child dependency of child case CA2 to parent case CA1 by specifying the case identifier "CA1" in the parent case field of CA2. A distinct feature of the metadata structure of Table 2 is that the structure covers three specific months of operating plans.

The preprocessing module 130 transmits to the principal component analysis module 140 the structured dataset mapping each case to the process variables representing the operating plan data of that case. From the structured dataset, the principal component analysis module 140 constructs a principal component analysis (PCA) model of the dataset. In an example embodiment, the principal component analysis module 140 can construct the PCA model using a state-of-the art multivariate modeling algorithm, such as AspenTech ProMV software.

The principal component analysis module 140 applies the constructed PCA model to reduce the dimensionality of the dataset. The applied PCA model projects the process variables of each case into a reduced space of latent variables or principal components, while retaining information of the process variables in the principal components. The projection by the PCA model determines principal components that are a linear combination of the process variables of each case, such that the maximum variance across the cases is extracted from the process variables and represented by the principal components. In this way, the values of the process variables of each case provide the mathematical constructs of the principal components. By applying the PCA model, the process variable reduction to latent variables is in the order of 95-98%. The application of PCA is described in Wold H., "Estimation of principal components and related models by iterative least squares In Multivariate Analysis," Krishnaiah P. (ed.), Academic Press: New York, 1966, pages 391-420 (herein incorporated by reference in its entirety).

In the context of the embodiments disclosed herein, the determination of the principal component(s) by the principal component analysis module 140 provides at least two innovative contributions to the classification of operating plan data. First, the determination provides the user with a ranking of the original process variables (primal and dual) according to their mathematical contribution to the latent variables. This ranking indicates which process variables are most important in describing in the principal components the variability across the cases of operating plan data. In other words, this ranking indicates the planning parameters (input) that change most significantly from one case or group of cases to another case or group of cases in the operating plan data. Second, the determination of the principal components enables finding the process variables that provide the structures or patterns in the dataset most relevant for indicating variability across cases. Most of the thousands of process variables in the original dataset do not contribute to providing such structures and patterns in the operating plan data of the cases.

The number of principal components is common across all cases and determined from the operating data. Then, for each case, the principal component analysis module 140 calculates a value for each principal component. If a principal component is not relevant to a particular case, the principal component analysis module 140 may set the principal component to zero for the particular case. The principal component module 140 structures the reduced dataset in a format mapping each case to the principal components (with set values) determined from the process variables of that case. In embodiments, the structured dataset is formatted as a M(cases) by P(principal components) matrix.

Figure 2A:
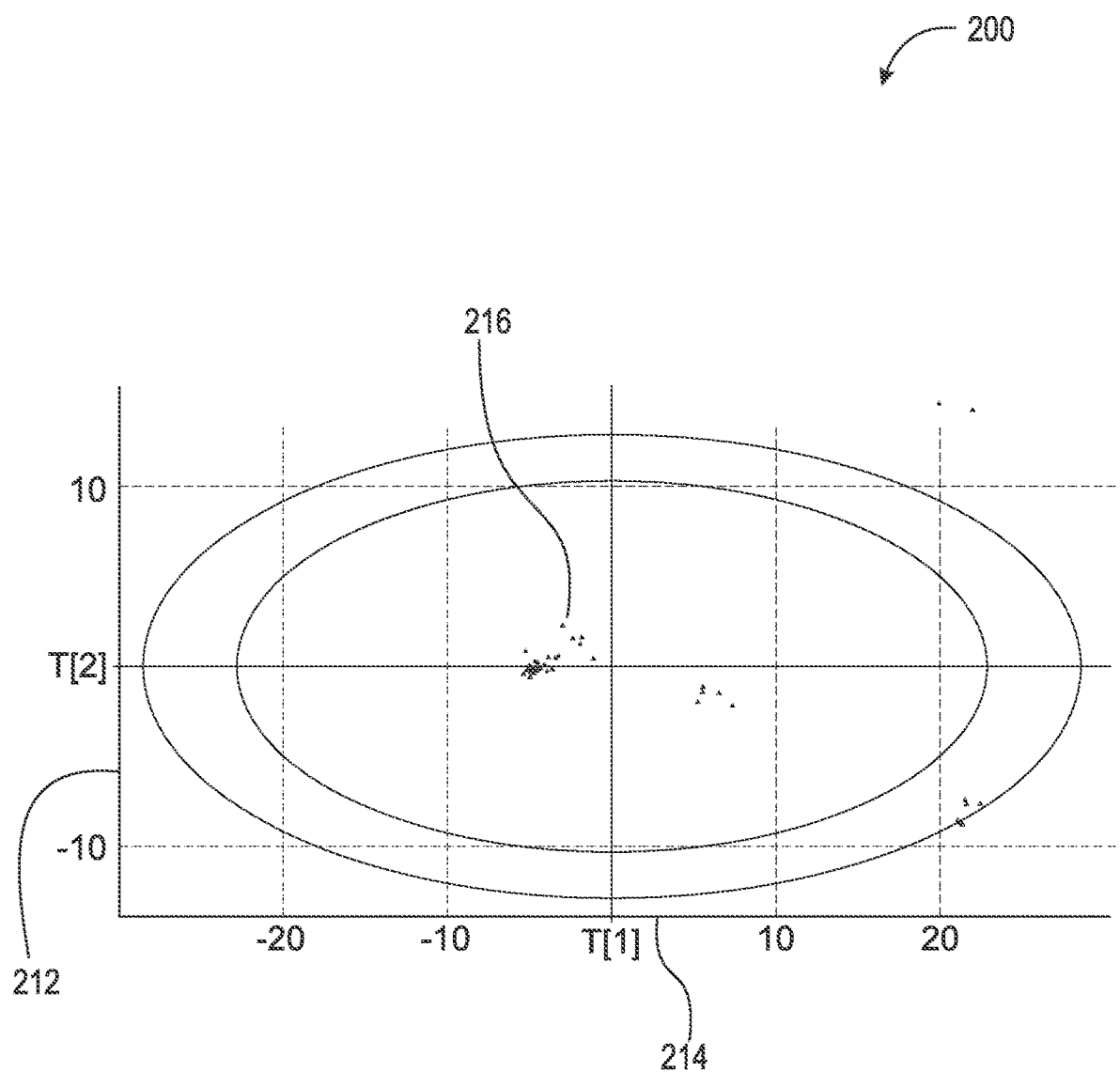
FIGS. 2A-2C are charts depicting case distributions in the space of principal components generated by an example embodiment.
Figure 2B:
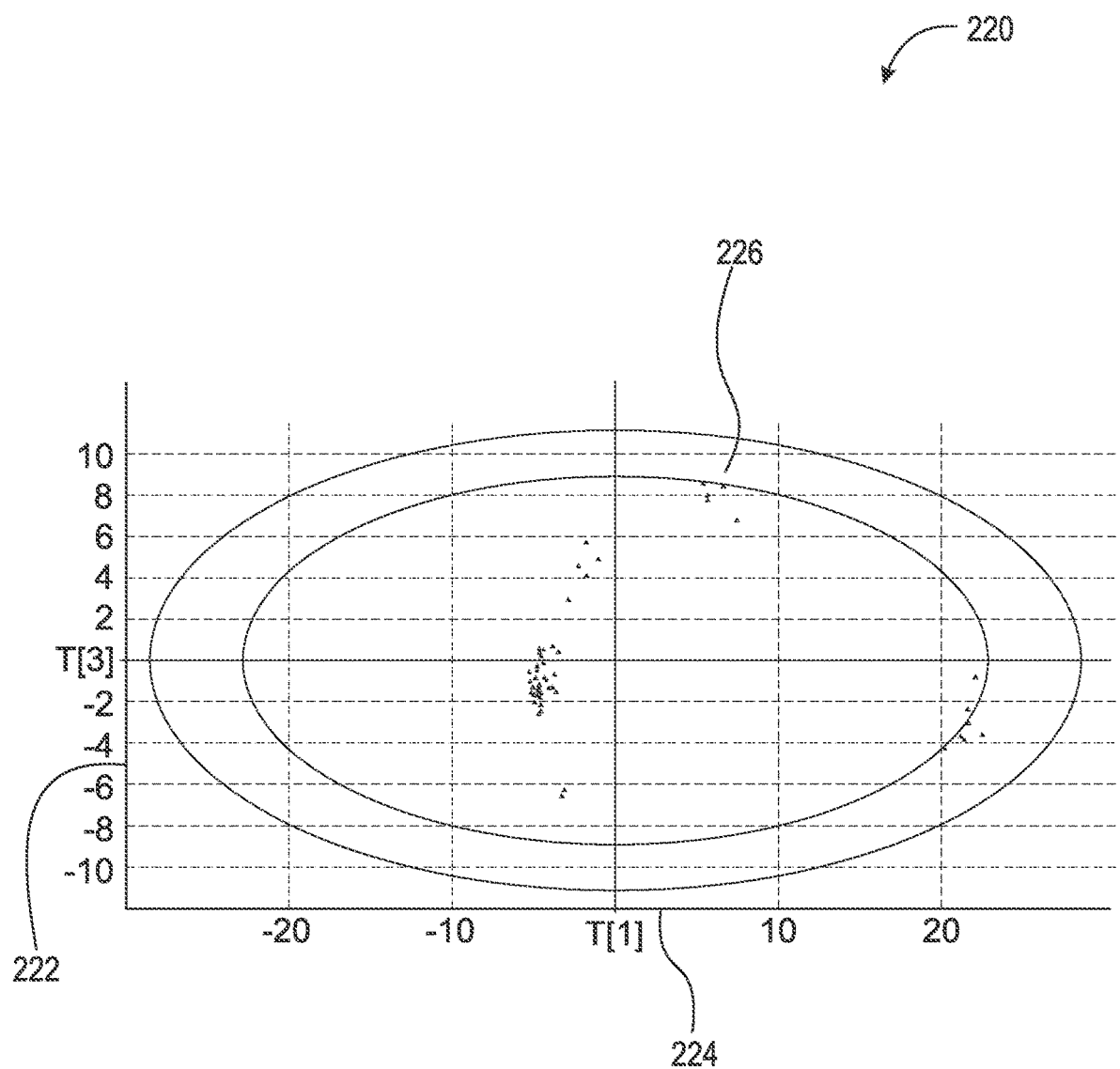
Figure 2C:
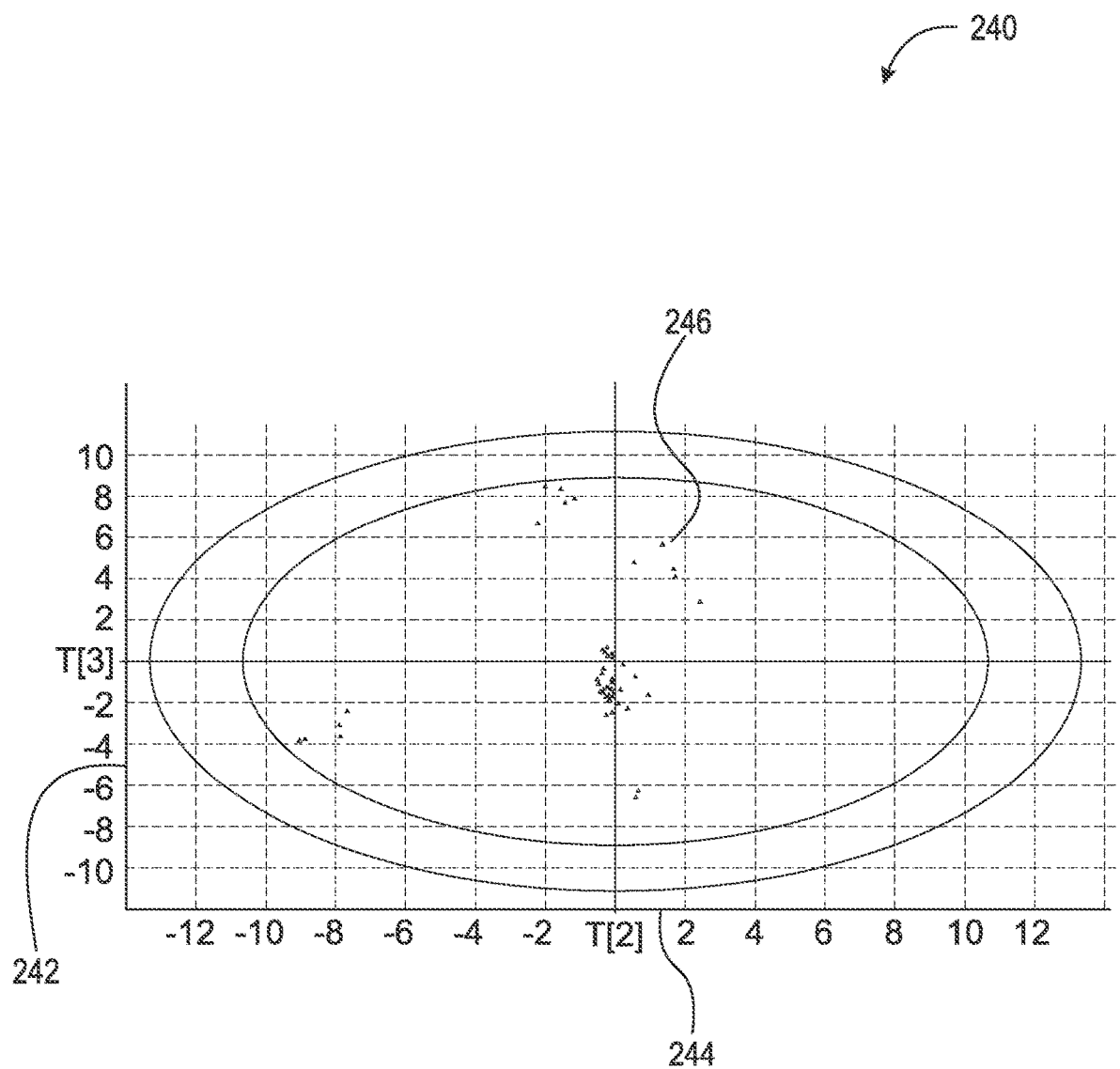

In an example embodiment, the preprocessing module 130 transmits the dataset of Table 1 consisting of 62 MOPs to the principal component analysis module 140. The principal component analysis module 140 constructs a PCA model that is used to reduce the more than 20,000 process variables of the 62 MOPs to 13 principal components in this example. Each of these principal components corresponds a direction of maximal data variation in the cases. For each case in the 62 MOPs, the principal component analysis module 140 further calculates values of the principal components. FIGS. 2A-2C shows the distribution of the cases in the space of three determined principal components (principal components 1, 2, and 3) based on the calculated principal components' values for the cases.

FIG. 2A is a graph 200 depicting distribution of cases in the space of principal component 1 and principal component 2. In FIG. 2A, values for principal component 1 are presented on the horizontal axis 214 and values for principal component 2 are presented on the vertical axis 212 of the graph 200. The cases, such as case CB16 (216), are shown on the graph 200 based on their respective calculated values for principal components 1 and 2.

FIG. 2B is a graph 220 depicting distribution of cases in the space of principal component 1 and principal component 3. In FIG. 2B, values for principal component 1 are presented on the horizontal axis 224 and values for principal component 3 are presented on the vertical axis 222 of the graph 220. The cases, such as case CB26 (226), are shown on the graph 220 based on their respective calculated values for principal components 1 and 3.

FIG. 2C is a graph 240 depicting distribution of cases in the space of principal component 2 and principal component 3. In FIG. 2A, values for principal component 2 are presented on the horizontal axis 244 and values for principal component 3 are presented on the vertical axis 242 of the graph 240. The cases, such as case CB46 (246), are shown on the graph 240 based on their respective calculated values for principal components 2 and 3.

The principal component analysis module 130 transmits to the hierarchical clustering module 150 the reduced dataset mapping each case to the principal components (with set values) determined from the process variables of that case. The hierarchical clustering module 150 uses a clustering technique to create a hierarchical structure from this reduced dataset. For example, the hierarchical clustering module 150 may use an agglomerative clustering technique to create the hierarchical structure. Agglomerative clustering is a well-known clustering technique, such as described in Fionn Murtagh et al., "Ward's Hierarchical Agglomerative Clustering Method: Which Algorithms Implement Ward's Criterion?," Journal of Classification 31, pages 274-295, 2014 (incorporated herein by reference in its entirety). For another example, the hierarchical clustering module 150 may use other clustering techniques, such as described in Rui Xu and Donald C. Wunsch, "Survey of Clustering Algorithms," IEEE Transactions on Neural Networks 16 (May), pages 645-678, 2005 (incorporated herein by reference in its entirety). The hierarchical clustering module 150 may use unsupervised machine learning techniques, such as described in Fabian Pedregosa et al., "Machine Learning in Python," Journal of Machine Learning Research 12 (Oct), pages 2825-2830, 2011 (incorporated herein by reference in its entirety).

In example embodiments, the clustering technique used by the hierarchical clustering module 150 starts by joining pairs of cases in the reduced dataset into first level clusters. The clustering technique selects which pairs of cases to join based on the values of the principal components for the cases. For example, a set of cases can be projected onto three Principal Components: PC1, PC2, and PC3; i.e., each case in the set has a specific value for PC1, PC2, and PC3. Each case in the data set can be described by its coordinates (PC1, PC2, PC3). Each case is a point in a tri-dimensional space, where a distance can be calculated between every pair of cases. In this example, the notion of distance corresponds to an intuitive understanding of "distance" in a tri-dimensional world. The concept can be generalized to any number of principal components by using Euclidean distance, or any other kind of vector norm in n-dimensional space. Then, if the distance between two cases is less than a predefined magnitude, those two cases are joined to generate the first level of the hierarchical structure. That magnitude can be based on a setting in the clustering algorithm, and can be modified. The clustering technique then joins the first level clusters and remaining cases in the reduced dataset not yet part of a cluster into second level clusters. The clustering technique selects which pairs of remaining cases and first level clusters to join based on the values of the principal components for the remaining cases and first level clusters. For example, if the values of the principal components of two first level clusters or a first level cluster and a remaining case is within a certain second distance to each other, they are joined to generate the second level of the hierarchical structure. Similarly, the clustering technique further joins the first level clusters, second level clusters, and any remaining cases in the reduced dataset not yet part of a cluster into third level clusters. The clustering technique selects which pairs of remaining cases, first level clusters, and second level clusters to join based on the values of the principal components for those remaining cases and clusters. For example, if the values of the principal components of two clusters or a cluster and a remaining case is within a certain third distance to each other, they are joined to generate the third level of the hierarchical structure. The clustering technique similarly continues until all cases are joined together into one cluster at the final level of the hierarchical structure. Clustering cases may not involve any type of mixing, average, or combination. The clusters can simply represent different ways in which the clusters can be grouped.

The disclosed embodiments leverage clustering technology in innovative ways. For example, embodiments can recognize that planning data is always provided with an implicit hierarchical structure. For one monthly operating plan, there are many weekly plans and several exploratory cases. By using a hierarchical clustering technique, the user can access clusters at both different temporal and spatial levels. For some validation scenarios, comparing a current operating case against a seasonal cluster is useful. In other validation scenarios, comparing a current level of processing availability against all weekly plans that most resemble that level of process availability is useful. The hierarchical structure allows planners to access data clusters based on such different aspects.

For further example, embodiments can exploit the clustering technique by pairing the created hierarchical structure with the user-defined metadata structure received by the preprocessing module 130. An example of this metadata structure is provided in Table 2. This metadata structure can be used to label the hierarchical classes or clusters of cases obtained through clustering. After the hierarchical clustering is complete, the hierarchical cluster module 150 compares the clusters at each level of the hierarchy (tree) against the expected groups that are implied by the user-defined metadata structure. Those clusters that most resemble the expected groups are labeled with the corresponding metadata label of the metadata structure and are used as the base cluster set. This base cluster set provides a reference point for the user when using the tree to find more specific cases or examining higher level clusters that synthesize the information of a wider range of cases.

Figure 2D:
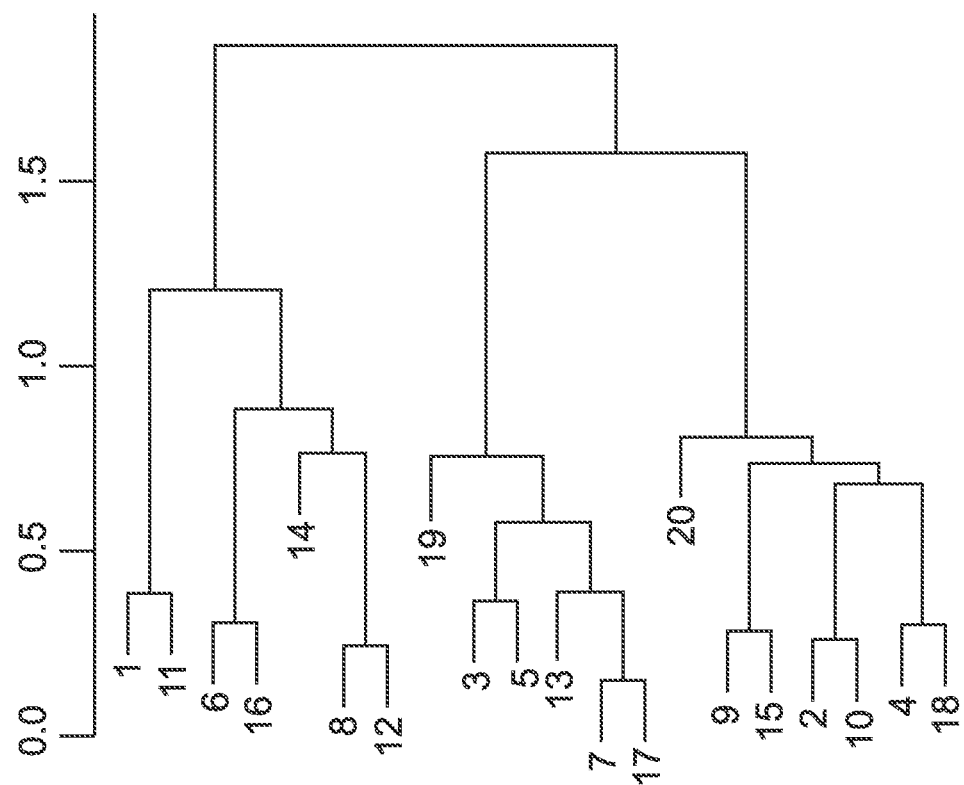
FIGS. 2D-2E are charts depicting an example hierarchical structure of case clusters in an example embodiment.

In an example embodiment, the hierarchical clustering module 150 applies the cluster technique to the illustrative dataset (>20,000 process variables of 62 MOPs in Table 1, which has been preprocessed by the preprocessing module 130 and projecting into 13 principal components by the principal component analysis module 140. The hierarchical clustering module 150 generates a hierarchical tree made up of 61 nodes. FIG. 2D shows an example representation of a hierarchical tree of clusters (nodes) that may be used by the hierarchical clustering module 150. In the example embodiments, the lowest level of the tree represents a list of the 62 cases in the illustrative dataset. Each of the nodes in each higher level represents a cluster of cases. The higher the node the more comprehensive the cluster of cases (i.e., the more cases the cluster includes).

In the example embodiment, the algorithm (e.g., unsupervised machine learning technique) implemented in the hierarchical clustering module 150 searches for nodes in the tree that most resemble the defined metadata structure obtained by the preprocessing module 130. In other words, the algorithm looks for the nodes in the tree where the 62 cases are grouped into cases from Month 1, Month 2, or Month 3.

TABLE 3

| Cluster 48 (~Month 1 from Metadata) |
| --- |
| CA3 |
| CA4 |
| CA5 |
| CA6 |
| CA9 |
| CA10 |
| CA11 |
| CA12 |
| CA13 |
| CA14 |
| CA15 |
| CA16 |
| CA17 |
| CA18 |
| CA18 |
| CA20 |
| CA21 |
| CA22 |
| CA23 |
| CA24 |
| CA25 |
| CA26 |
| CA27 |
| CA28 |
| CA29 |
| CA30 |
| CA31 |
| CA34 |
| CA36 |

TABLE 3-continued

| Cluster 48 (~Month 1 from Metadata) |
| --- |
| CA37 |
| CA38 |
| CA40 |
| CA41 |
| CA42 |
| CA43 |
| CA44 |
| CA45 |
| CA46 |
| CA47 |

TABLE 4

| Cluster 38 (~Month 2 from Metadata) | |
| --- | --- |
| CB5 | CB8 |
| CB9 | CB10 |

TABLE 5

| Cluster 2 (~Month 3 from Metadata) | |
| --- | --- |
| CC1 | CC20 |

Tables 3-5 show the three nodes (cluster 48, cluster 38, and cluster 2) out of the 61 nodes in the tree that most resemble the metadata structures for Month 1, Month 2, and Month 3 respectively. These node clusters are considered the baseline clusters.

TABLE 6

| Cluster 24 | |
| --- | --- |
| CB14 | CB16 |

TABLE 7

| Cluster 18 | |
| --- | --- |
| CA32 | CA39 |

TABLE 8

| Cluster 32 | |
| --- | --- |
| CB11 | CB13 |

Tables 6-8 show the clustering of the remaining cases that could not be matched to a metadata structure cluster based on the metadata structures. The algorithm executed by the hierarchical clustering module 150 allows deeper examination into any of the baseline clusters to understand how the cases within each of the clusters form sub-structures of clusters or subclusters (weekly operating plans, sensitivity analysis, etc.).

Figure 2E:
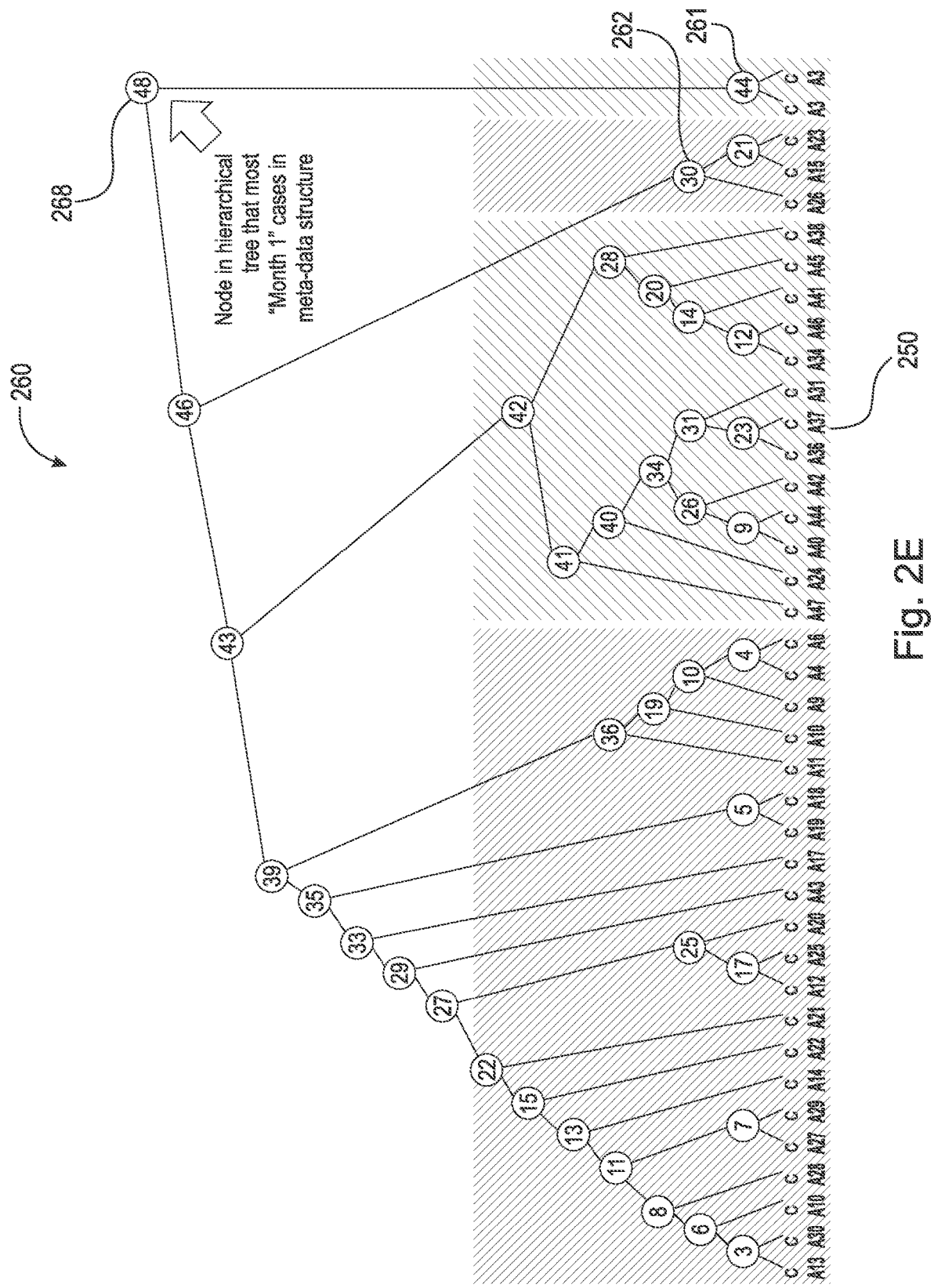

FIG. 2E shows an example hierarchical structure graph 260 for cluster 48 (subclusters within Month 1 MOP cases), which best resembles Month 1 in the illustrative metadata structure of Table 2. The example hierarchical structure graph 260 is generated by applying a clustering technique to the reduced dataset transmitted from the principal component analysis module 140. The hierarchical structure graph 260 in FIG. 2E includes at the bottom the cases 250 in cluster 48. As the values of the principal components for cases CA3 and CA5 in the reduced dataset are within a certain first distance to each other, the cases CA3 and CA5 are joined to generate cluster 44 in the first level 261 of the hierarchical structure 260. Similarly, as the values of the principal components of cases CA40 and CA44 are within a certain first distance to each other, the case CA40 and CA44 are joined to generate cluster 9 in the first level 261 of the hierarchical structure. Further, as the values of the principal components of cluster 9 and case CA42 are within a certain second distance to each other, the cluster 9 and case CA42 are joined in the second level 262 of the hierarchical structure graph 260. The cases/clusters are continued to be joined together in this matter until all the cases are joined into cluster 48 at the final level 268 of the hierarchical structure graph 260.

In the context of the illustrative dataset, the hierarchical structure obtained through the execution of the modules in the disclosed embodiments may assist planners validating a future operating plan for the trimester of Month 1 through Month 3. The validation may be performed simply against the most relevant baseline cluster (clusters of MOPs) of the hierarchical structure or may be performed in more detail against a particular sub-cluster within the cluster of MOPs in the hierarchical structure, such as those shown in FIG. 2E for Month 1.

Figure 1B:
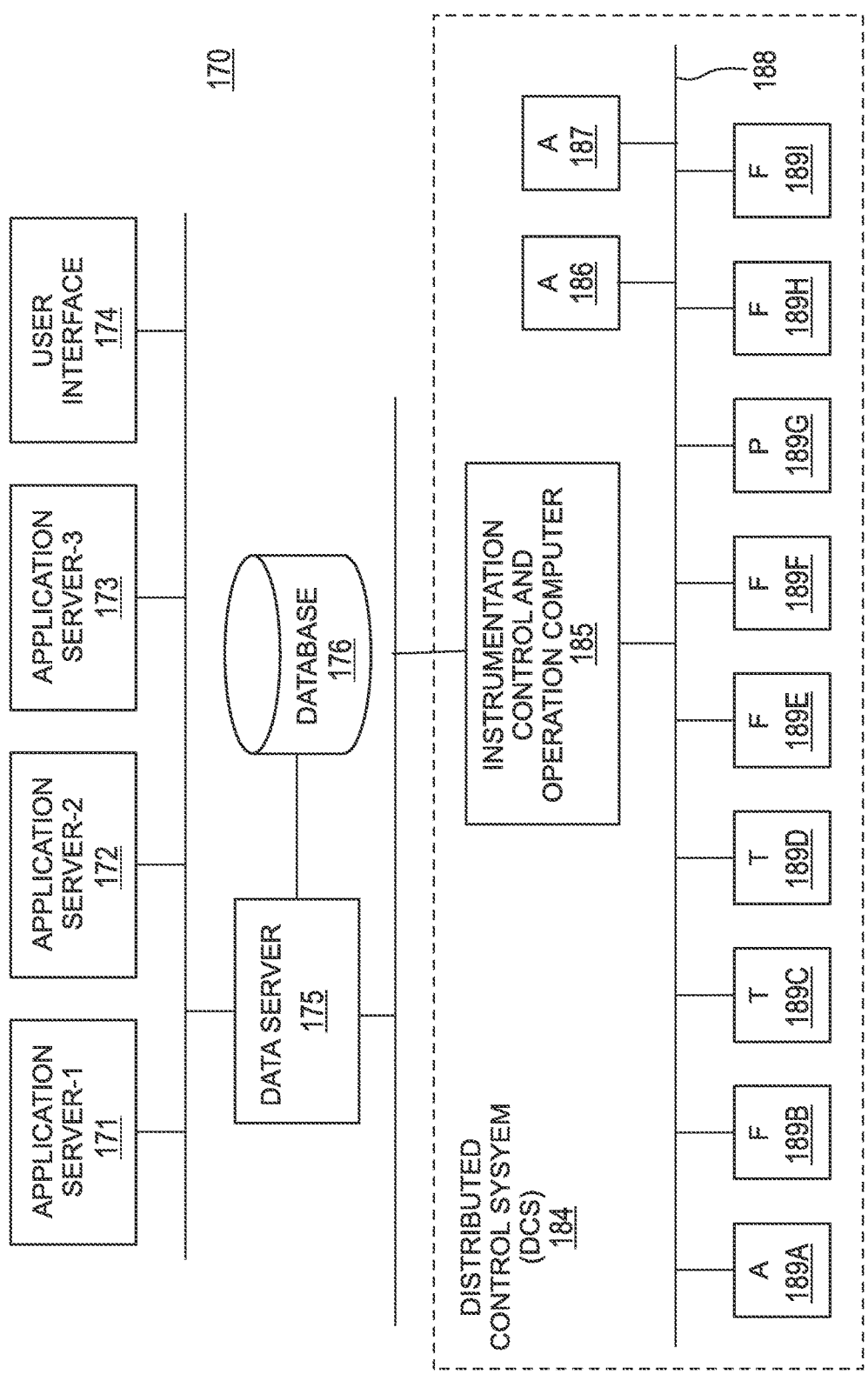
FIG. 1B is a block diagram of another example system for classifying operating and scheduling plan data, according to an example embodiment.

FIG. 1B depicts an example system 170 classifying operating and scheduling plan data of a process plant, according to an example embodiment. The system 170 may be configured as part of the computer network of a chemical or industrial plant (e.g., refinery).

The system 170 includes a user interface device 174 (e.g., user interface 115 executing on display device 110 of FIG. 1A). From the user interface 174, a user (e.g., operation planner or other plant personnel) may define plant operating plans (or plant operating and scheduling plans) that include plan data configured as operating cases. The operating cases represent the operating plan data by process variables (primal and dual). As part of defining the operating plan, the user may, via the user interface 174, also define metadata structures mapping the dependencies between operating cases. The user interface device 174 is communicatively coupled to data server 175 (and/or Information Management System 160, such as PIMS) that stores the defined plant operating plans with other historical operating plans in database 176. The data server 175 may also store the defined metadata structures.

The system 170 also includes a first application server 171 configured to implement an embodiment of the preprocessor module 130 of FIG. 1A. The first application server 171 is coupled to the data server 175, where the first application server 171 receives one or more historical operating plans. The first application server 171 generates a dataset in a format mapping each case of the historical plant operating plans to the process variables (with set values) representing the operating plan data of that case.

The system 170 also includes a second application server 172 configured to implement an embodiment of the principal component analysis module 140 of FIG. 1A. The second application server 172 receives the generated dataset from the first application server 171. The second application server 172 applies the constructed PCA model to reduce the dimensionality of the dataset. To do so, the applied PCA model determines principal components (latent variables) that are a linear combination of the process variables, such that the maximum variance across the cases is extracted from the process variables and represented by the principal components. For each operating case, the second application server 172 calculates values for the principal components determined from the process variables of that case. The second application server 172 structures the reduced dataset in a format mapping each case to the principal components (with calculated values) determined from the process variables of that case.

The system 170 further includes a third application server 173 configured to implement an embodiment of the hierarchical clustering module 150 of FIG. 1A. The third application server 173 receives the reduce dataset from the second application server 172. The third application server 173 uses a clustering technique to create a hierarchical structure from the reduced dataset based on the calculated principal component values for each case. The hierarchical structure classifies the cases according to operating and marketing conditions characterized by the principal components. The third application server 173 then uses the defined metadata structure to label the hierarchical classes or clusters of cases obtained through clustering. The third application server 173 may communicate with the data server 175 to retrieve the metadata structure from the database 176. The third application server 173 compares the clusters at each level of the hierarchy (tree) against the expected groups that are implied by the dependencies in the metadata structure. Those clusters that most resemble the expected groups are labeled with the corresponding metadata label of the metadata structure and are identified as base clusters of the hierarchy. The third application server 173 may communicate the labeled hierarchical structure to the data server 175 to store in database 176 or to the user interface device 174 for display to the user.

Example Method of Classifying Operating and Scheduling Plan Data

Figure 3:
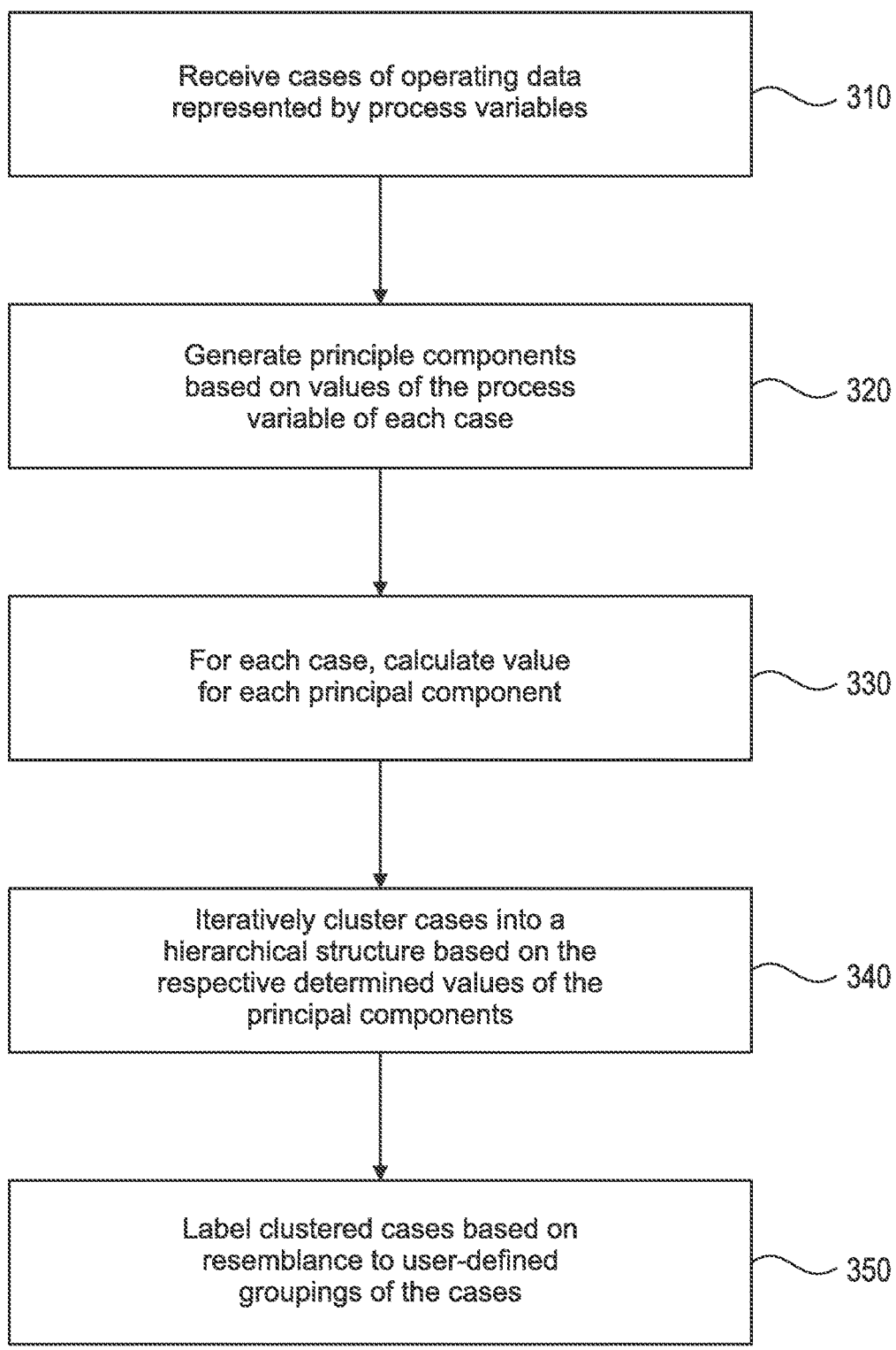
FIG. 3 depicts a flow chart of an example method for classifying operating and scheduling plan data in an example embodiment.

FIG. 3 depicts a flow diagram of an example method 300 for classifying operating and scheduling plan data, according to an example embodiment. In example embodiments, the method 300 can be executed by the system 100 of FIG. 1A or system 170 of FIG. 1B. The method 300 begins at step 310 by receiving cases of operating plan data represented by process variables of a plant, refinery, or other industrial process. For example, the cases may include operating plan data for the full Month 2, operating plan data for weeks 1-2 of Month 2, operating plan data for the 1st day of Month 2, and such. The received cases of operating plan data may be part of one or more operating and scheduling plans used to run the plant process. The operating and scheduling plans may include historical operating and scheduling plans of the plant process retrieved from memory (e.g., database) and active operating and scheduling plans retrieved from a currently executing plant process. The received cases of operating plan data are arranged together as a dataset.

The process variables representing each case are set to values to achieve an optimal solutions of operating the plant for that case. For example, in the case of the 1st day of Month 2, the process variables are set to values for achieving an optimal solution for operating the plant on the 1st day of Month 2. The process variables may include primal variables that are measured in the plant process (e.g., flow, temperature) and dual variables that are determined by a mathematic formula based on the plant process data (e.g., amount mass conserved). The method 300 (step 310) formats the dataset into a structure, such as a matrix, that maps each case to the process variables (with set values) corresponding to that case.

The method 300 continues at step 320 by generating principal components based on values of the process variables of each case. To generate the principal components, the method 300 (step 320) constructs a statistical analysis model from the structured dataset mapping each case to the corresponding process variables. The model may be a principal component analysis (PCA) model, or a Partial Least Squares (PLS) Model, such as described in Wold, S., Johannson, E., and Cocchi, M. (1993), PLS—Partial Least-squares projections to latent structures (incorporated herein by reference in its entirety), or in H. Kubinyi, 3D-QSAR in Drug Design, Theory, Methods, and Applications (pp. 523-550), Ledien: ESCOM Science (incorporated herein by reference in its entirety). Using the model, the method 300 (step 320) determines the principal components as a linear combination of the process variables in the structured dataset, such that the maximum variance across the cases is extracted from the process variables of each case and represented by the principal components. Stated differently, the model projects the process variables of each case into a reduced space of the principal components (latent variables), which retain information of the process variables while indicating maximum variance in conditions across the cases. The method (step 320) reduces the dataset by replacing the process variables in the dataset with the principal components. An example of PCA is described in Wold H., "Estimation of principal components and related models by iterative least squares In Multivariate Analysis," Krishnaiah P. (ed.), Academic Press: New York, 1966, pages 391-420 (incorporated herein by reference in its entirety).

For each case, the method 300, at step 330, calculates a value for each principal component from the operating plan data of that case. The method 300 (step 330) formats the reduced dataset into a structure, such as a matrix, that maps each case to the principal components (with calculated values) corresponding to that case. The method 300, at step 340, iteratively clusters the cases into a hierarchical structure based on the respective determined values of the principal components. For example, the method 300 (step 340), using a clustering technique (e.g., agglomerative clustering), joins pairs of cases having principal component values within a certain first distance of each other into first level clusters. The method 300 (step 340) then joins pairs of clusters and remaining cases having principal component values within a certain second distance of each other into second level clusters. The method 300 (step 340) continues joining pairs of clusters and remaining cases in this manner until all the cases are joined together into one final level cluster of the hierarchical structure.

The method 300 (step 350) labels clustered cases of the hierarchical structure based on resemblance to groupings of the cases in a user-defined metadata structure. The user-defined metadata structure groups the cases based on the user-defined dependencies between the cases. The hierarchical structure may then be used to create and validate current operating plans based on operating and marketing conditions classified through the labeled cluster of cases.

Example Digital Processing Environment

Figure 4:
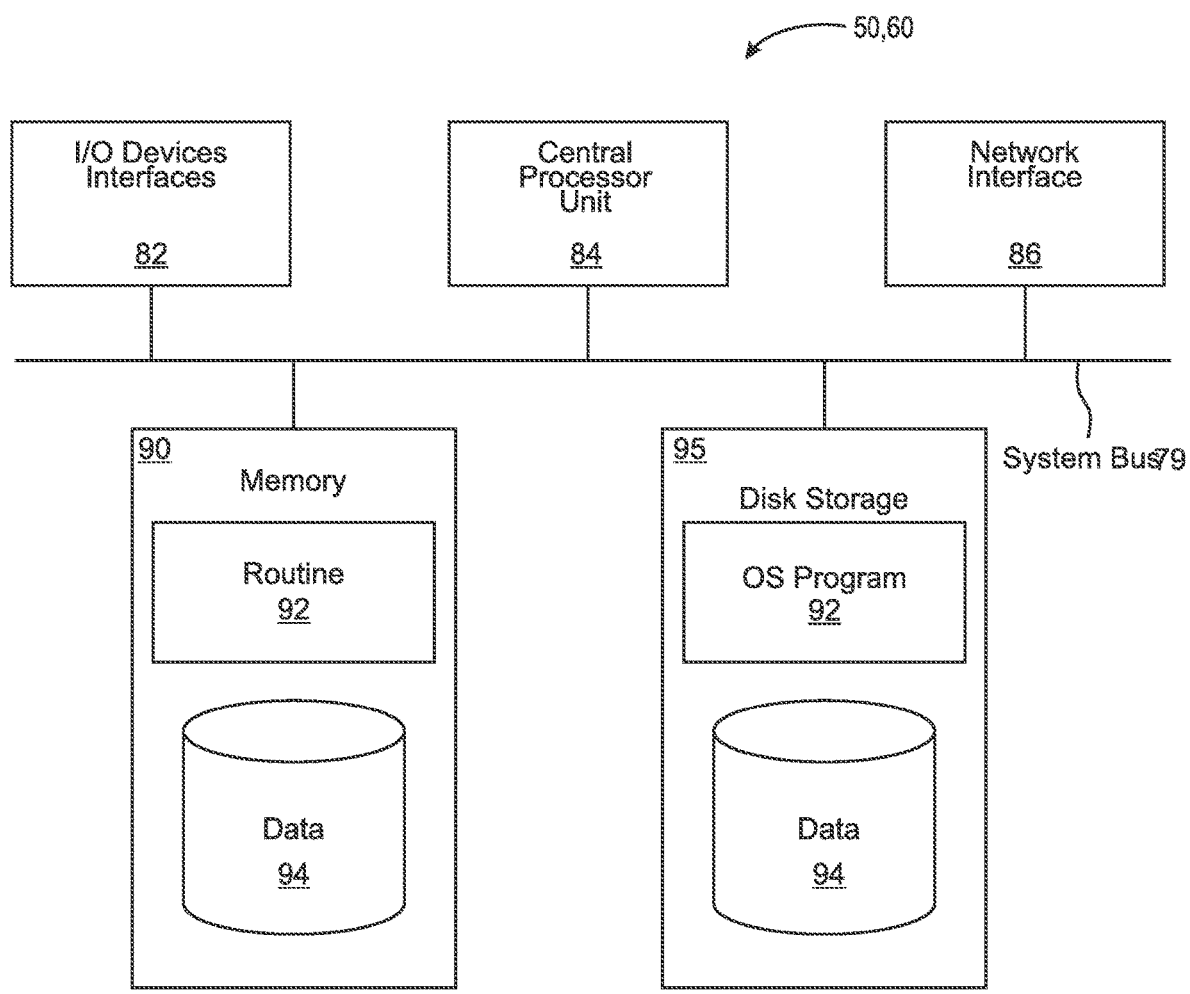
FIG. 4 is a schematic view of a computer network in which embodiments can be implemented.

FIG. 4 illustrates a computer network or similar digital processing environment in which the disclosed embodiments may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. For example, classification engine 120, display device 110, and information management system 160 of FIG. 1A may be configured as client devices 50 and/or server computers 60 linked through communication network 70. For another example, application servers 171, 172, 173 data server 175, user interface device 174, and DCS 184 of FIG. 1B may be configured as client devices 50 and server computers 60 linked through communication network 70. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 5:
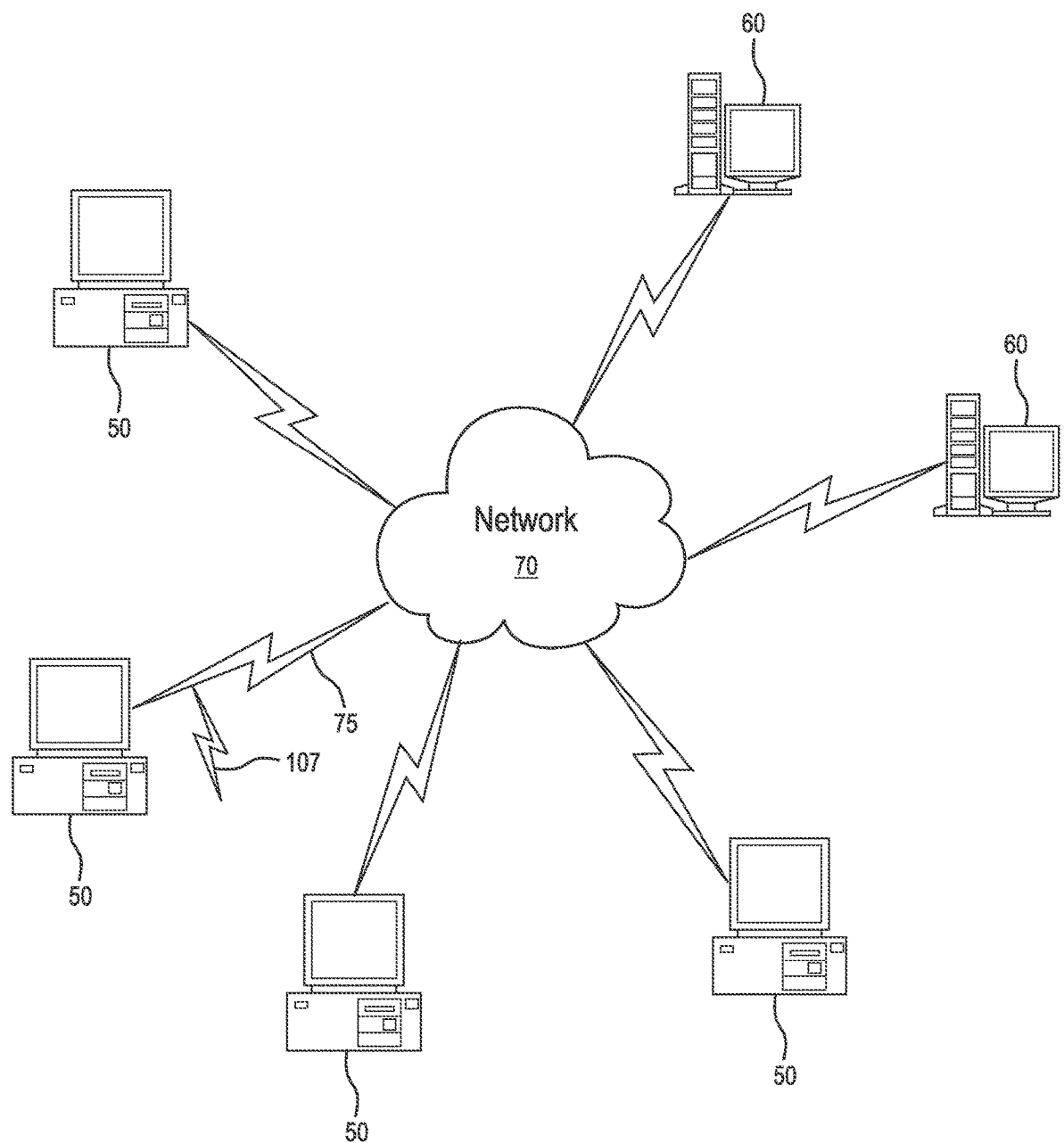
FIG. 5 is a block diagram of a computer node or device in the computer network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports) that enables the transfer of information between the elements. Attached to system bus 79 is I/O device interface 82 for connecting various input and output devices (e.g., keyboard, mouse, displays, printers, speakers) to the computer 50, 60. For example display device 110 of FIG. 1A or user interface device 173 may be connected to the computer 50, 60 by I/O device interface 82.

Network interface 86 allows the computer to connect to various other devices attached to a network (e.g., network 70 of FIG. 4, network 188 of FIG. 1B). Memory 90 provides volatile storage for computer software instructions 92 and data 94 used to implement an embodiment (e.g., modules 130, 140, 150 and user interface 115 of FIG. 1A and method 300 of FIG. 3). Disk storage 95 provides non-volatile storage for computer software instructions 92 and data 94 used to implement an embodiment. Data 94 may include plant operating plans, plant scheduling plans, datasets of operating and/or scheduling plan data cases, PCA models, instructions for clustering techniques, hierarchical clustering structures, metadata structures, and so forth as previously discussed. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes) that provides at least a portion of the software instructions for the disclosed system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so called Software as a Service (SaaS), or other installation or communication supporting end-users.

The Teachings of all Patents, Published Applications and References Cited Herein are Incorporated by Reference in their Entirety It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way. Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer-implemented method of classifying operating plan data of an industrial process, the method comprising:
   receiving a dataset including operating plan data for multiple cases, each case of the multiple cases being represented by one or more process variables and, thereby, the received dataset including a number of process variables;
   receiving a metadata structure defining dependencies between cases of the multiple cases, wherein the metadata structure indicates labels associated with the cases of the multiple cases;
   reducing the number of process variables in the dataset by: (i) generating at least one principal component from values of the one or more process variables and (ii) replacing the one or more process variables in the dataset with the generated at least one principal component;
   for each case, determining a respective value of each generated principal component in the dataset;
   iteratively clustering the multiple cases into a hierarchical classification structure based on the determined respective value of each generated principal component;
   comparing clusters of the multiple cases in the hierarchical classification structure to the received metadata structure to identify given clusters in the hierarchical classification structure organized in accordance with the defined dependencies; and labeling the identified given clusters using the indicated labels.

2. The method of claim 1, wherein the operating plan data includes scheduling data.

3. The method of claim 1, wherein the one or more process variables include primal variables and dual variables.

4. The method of claim 1, wherein at least one of:
operating plan data for a given case of the multiple cases defined based on at least one of: time period, operating conditions, marketing conditions, scheduling conditions, material composition, transactional elements, and discrete events including at least one of: shipments, transfers, receipts, maintenance, and campaigns; and
at least one case of the multiple cases is a child of another case of the multiple cases.

5. The method of claim 1, further comprising structuring the received dataset by mapping each case to values of the one or more process variables for the case.

6. The method of claim 1, wherein reducing the dataset includes constructing a principal component analysis (PCA) model that reduces dimensionality of the data of the dataset.

7. The method of claim 1, wherein the at least one principal component is generated by projecting the values of the one or more process variables into a reduced space of latent variables, the latent variables representing the one or more process variables based on relevancy in indicating variability across the multiple cases.

8. The method of claim 1, further comprising structuring the dataset by mapping each case to the respective determined values of the at least one principal component.

9. The method of claim 1, wherein the iterative clustering is performed using one or more agglomerative clustering techniques.

10. The method of claim 1, wherein iteratively clustering the multiple cases includes:
joining cases into pairs based on respective determined values of the generated principal components being within a certain first distance to each other, the joined pairs representing first level clusters of the hierarchical structure;
joining the first level clusters and cases into pairs based on respective determined values of the generated principal components being within a certain second distance to each other, the joined first level clusters and cases representing second level clusters of the hierarchical structure; and
continuing joining prior level clusters and cases into pairs based on respective determined values of generated principal components until all the multiple cases are included in a single cumulative cluster, the single cumulative cluster representing the final level cluster of the hierarchical structure.

11. The method of claim 1, wherein the dependencies defined by the metadata structure are based on business priorities and the method further comprises:
identifying a case as an outlier in a context of the clusters of the multiple cases in the hierarchical structure.

12. A computer system for classifying operating planning data of an industrial process, the system comprising:
a processor operatively coupled to a data storage system, the processor configured to implement:
a preprocessing module configured to:
receive a dataset including operating plan data for multiple cases, each case of the multiple cases being represented by one or more process variables and, thereby, the received dataset including a number of process variables; and
receive a metadata structure defining dependencies between cases of the multiple cases, wherein the metadata structure indicates labels associated with the cases of the multiple cases;
a principal component analysis module configured to:
reduce the number of process variables in the dataset by: (i) generating at least one principal component from values of the one or more process variables and (ii) replacing the one or more process variables in the dataset with the generated at least one principal component, and
for each case, determine a respective value of each generated principal component in the dataset; and
a hierarchical clustering module configured to:
iteratively cluster the multiple cases into a hierarchical classification structure based on the determined respective value of each generated principal component;
compare clusters of the multiple cases in the hierarchical classification structure to the received metadata structure to identify given clusters in the hierarchical classification structure organized in accordance with the defined dependencies; and
label the identified given clusters using the indicated labels.

13. The system of claim 12, wherein the operating plan data includes scheduling data.

14. The system of claim 12, wherein the one or more process variables include primal variables and dual variables.

15. The system of claim 12, wherein at least one of:
operating plan data for a given case of the multiple cases is defined based on at least one of: time period, operating conditions, marketing conditions, scheduling conditions, material composition, transactional elements, and discrete events including at least one of: shipments, transfers, receipts, maintenance, and campaigns; and
at least one case of the multiple cases is a child of another case of the multiple cases.

16. The system of claim 12, wherein the preprocessing module is further configured to structure the received dataset by mapping each case to the one or more process variables that represent the operating plan data of the case.

17. The system of claim 12, wherein the principal component analysis module is configured to reduce the dataset by constructing a principal component analysis (PCA) model that reduces dimensionality of the data of the dataset.

18. The system of claim 12, wherein the principal component analysis module is configured to generate the at least one principal component by projecting the values of the one or more process variables into a reduced space of latent variables, the latent variables representing the one or more process variables based on relevancy in indicating variability across the multiple cases.

19. The system of claim 12, wherein the principal component analysis module is further configured to structure the dataset by mapping each case to values of the at least one principal component.

20. The system of claim 12, wherein the hierarchical clustering module is configured to perform the iterative clustering using one or more agglomerative clustering techniques.

21. The system of claim 12, wherein the hierarchical clustering module is configured to iteratively cluster the multiple cases by:
- joining cases into pairs based on respective determined values of the generated principal components being within a certain first distance to each other, the joined pairs representing first level clusters of the hierarchical structure;
- joining the first level clusters and cases into pairs based on respective determined values of the generated principal components being within a certain second distance to each other, the joined first level clusters and cases representing second level clusters of the hierarchical structure; and
- continuing joining prior level clusters and cases into pairs based on respective determined values of generated principal components until all the multiple cases are included in a single cumulative cluster, the single cumulative cluster representing the final level cluster of the hierarchical structure.

22. The system of claim 12, wherein the dependencies defined by the metadata structure are: based on business priorities and the hierarchical clustering module is further configured to:
- identify a case as an outlier in a context of the clusters of the multiple cases in the hierarchical structure.

23. A non-transitory computer-readable data storage medium comprising instructions causing a computer to:
- receive a dataset including operating plan data for multiple cases, each case of the multiple cases being represented by one or more process variables and, thereby, the received dataset including a number of process variables;
- receive a metadata structure defining dependencies between cases of the multiple cases, where the metadata structure indicates labels associated with the cases of the multiple cases;
- reduce the number of process variables in the dataset by: (i) generating at least one principal component from values of the one or more process variables and (ii) replacing the one or more process variables in the dataset with the generated at least one principal component;
- for each case, determine a respective value of each generated principal component in the dataset;
- iteratively cluster the multiple cases into a hierarchical classification structure based on the determined respective value of each generated principal component;
- compare clusters of the multiple cases in the hierarchical classification structure to the received metadata structure to identify given clusters in the hierarchical classification structure organized in accordance with the defined dependencies; and
- label the identified given clusters using the indicated labels.

* * * * *

UNITED STATES PATENT AND TRADEMARK OFFICE
CERTIFICATE OF CORRECTION

PATENT NO. : 11,321,376 B2
APPLICATION NO. : 16/372970
DATED : May 3, 2022
INVENTOR(S) : Sabastian Terrazas-Moreno, Stacy Janak and Dimitrios Varvarezos It is certified that error appears in the above-identified patent and that said Letters Patent is hereby corrected as shown below:

In the Claims

In Claim 4, Column 19, Line 12, insert -- is -- before the word "defined"

Signed and Sealed this
Twenty-first Day of June, 2022

Katherine Kelly Vidal
*Director of the United States Patent and Trademark Office*